United States Patent
Sletten et al.

[11] 3,735,400
[45] May 22, 1973

[54] AMTI RADAR CLUTTER CANCELLING METHOD AND APPARATUS

[75] Inventors: Carlyle J. Sletten, Acton; F. Sheppard Holt, Winchester, both of Mass.

[73] Assignee: The United States of America as represented by the Secretary of the Air Force, Washington, D.C.

[22] Filed: Nov. 23, 1971

[21] Appl. No.: 201,582

[52] U.S. Cl..............343/7.7, 343/5 CM, 343/17.1 R
[51] Int. Cl...............................................G01s 9/42
[58] Field of Search................343/5 CM, 7.7, 17.1 R

[56] References Cited
UNITED STATES PATENTS 3,161,873   12/1964   Hollingsworth.......................343/7.7

Primary Examiner—T. H. Tubbesing
Attorney—Harry A. Herbert, Jr. and Willard R. Matthews Jr.

[57] ABSTRACT

The locating and tracking of moving targets in ground clutter is accomplished by an airborne synthetic aperture radar system. Radar doppler echo signals are received simultaneously on three antennas disposed along the flight velocity vector of the aircraft. dispersive delay filters establish multiple narrow band channels for doppler signals in the clutter frequency spectrum and effect phase coincidence of such signals in each antenna. Clutter cancellation is accomplished by phase inverting the output of the center antenna and summing the outputs of adjacent antennas. Effective antenna gain and signal directivity on moving targets are increased by integrating many echoes following each filter. The doppler filters of the system are linked to the delay lines with an aircraft velocity dependent switch and gain adjusting means are provided for each antenna.

8 Claims, 5 Drawing Figures

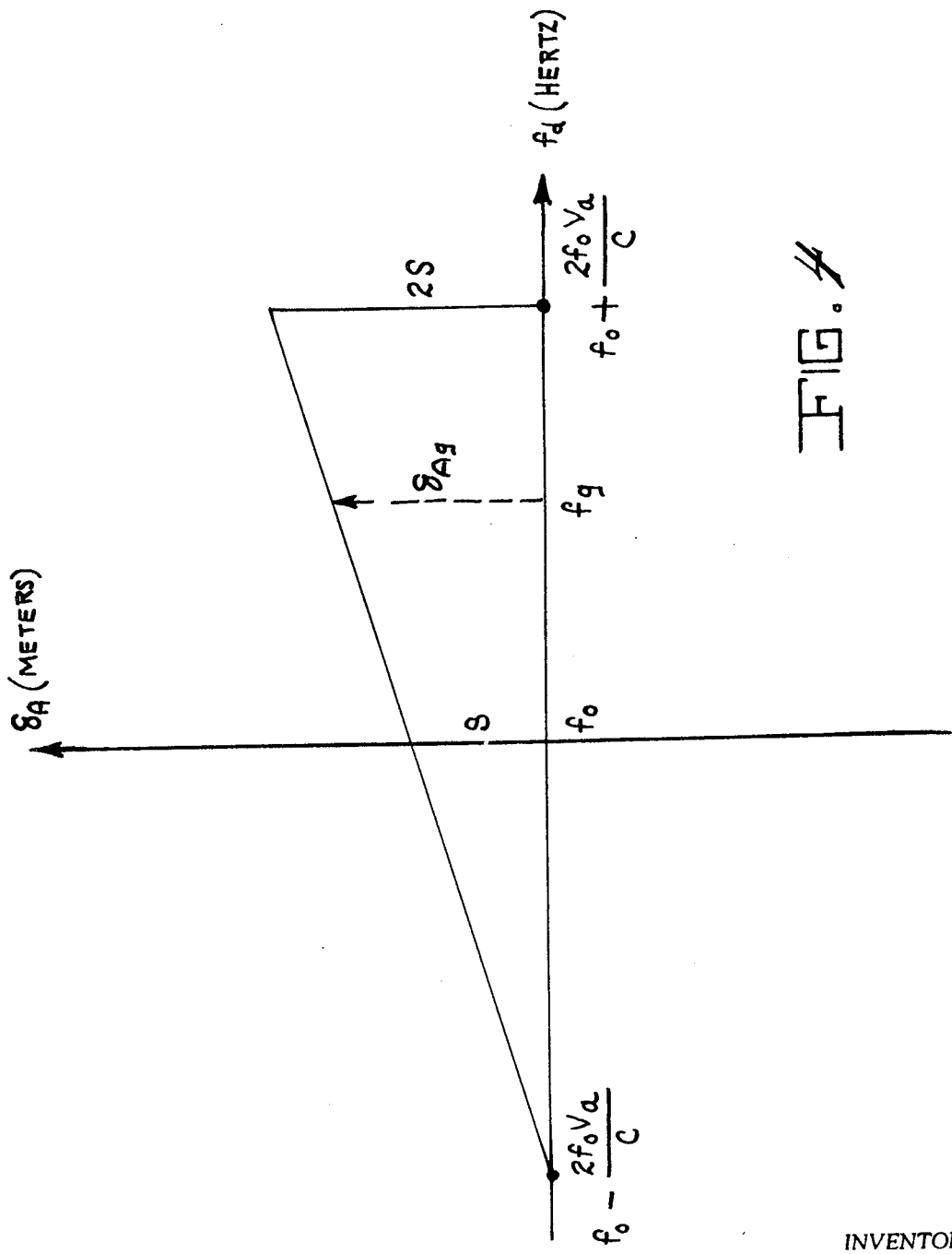

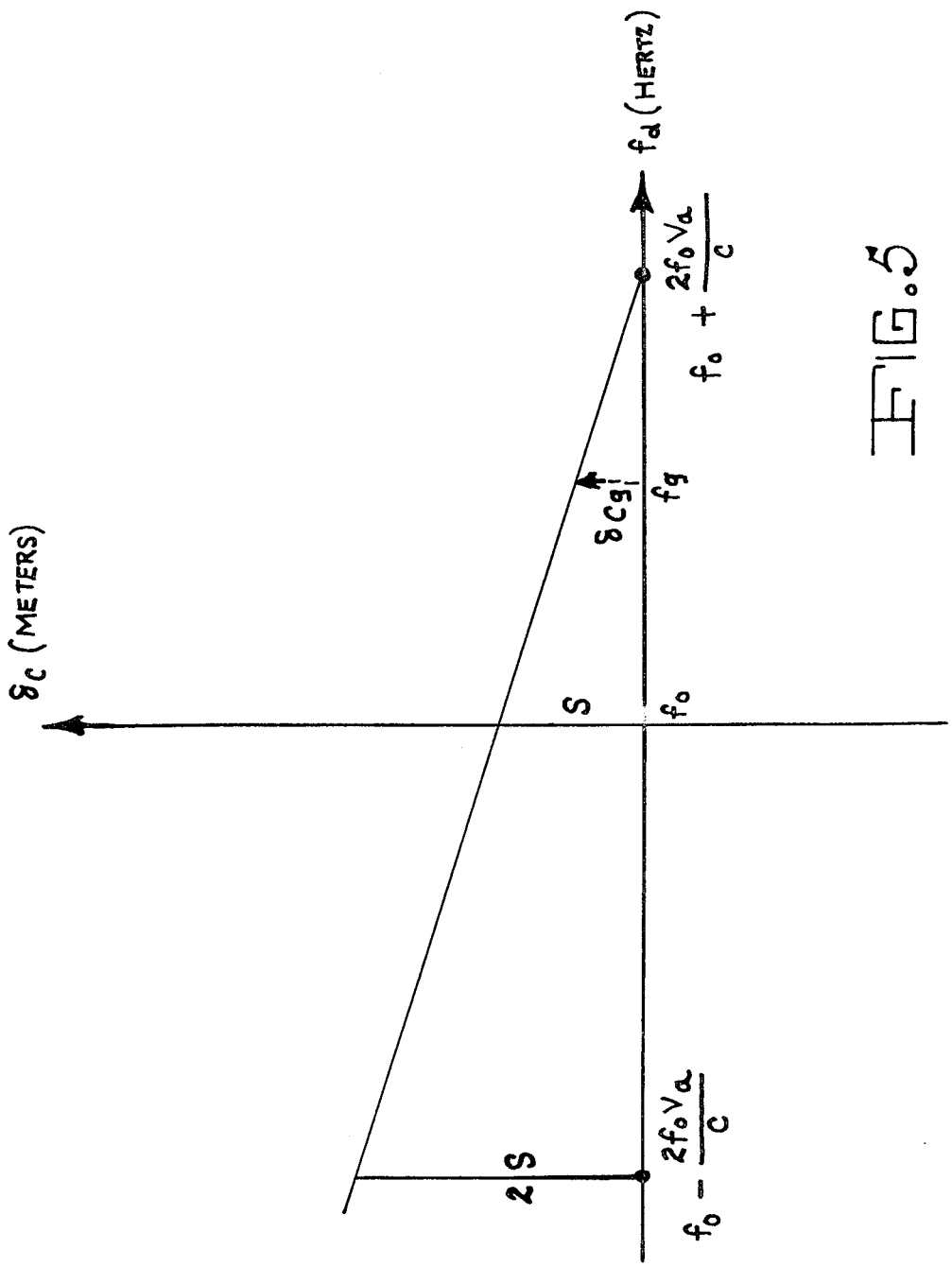

AMTI RADAR CLUTTER CANCELLING METHOD AND APPARATUS

BACKGROUND OF THE INVENTION

This invention relates to airborne moving target indicating radar systems, and particularly to a novel method and apparatus for eliminating the adverse effects of ground clutter on the performance of such systems.

Conventional radar systems have proven inadequate in various ways when used for airborne search for hostile missiles and aircraft.

Large antennas and radomes are required for the pulse-doppler radars currently used. The performance of these radars is degraded because of false alarms due to ground clutter echoes and the coverage of air space is often restricted owing to range-doppler ambiguities and blind spots. A very large national effort has been expended on these problems within the framework of conventional radar. To date no satisfactory solution has been achieved with conventional radar techniques.

A coincident phase center clutter rejection scheme has been proposed in an attempt to upgrade the performance of such radar systems. The basic idea of this clutter cancellation scheme is to have the phase centers of the receiving and transmitting antennas traverse the same identical path at two (or more) different times a short known time interval, $\Delta\tau$ apart. The radar returns from stationary targets will be the same for echoes collected during these two times. Therefore, delaying the first signals collected by $\Delta\tau$ and subtracting them in phase and amplitude results in cancellation of stationary target echoes. Any targets moving enough to change the phase sufficiently during $\Delta\tau$ will emerge uncancelled. One trouble with this approach is that true simultaneity cannot be realized on the two samples which are simply taken at different times with different antennas. In case antennas are not identical there is no good way to correct for gain differences with angle. There is also some dead-time in the cycles. Signal-to-noise ratios on targets are not good because all signals over the entire doppler spectrum are combined in the canceller. Simultaneity is needed if good interferometric phase measurements for angular bearings are to be obtained.

The applicability of synthetic aperture techniques to moving target problems has also been considered. As presently developed, synthetic aperture techniques will not perform the radar functions desired. Fast moving targets with respect to the earth's surface are not located or tracked. In most cases real-time data over wide-look angles are not obtained. However, some of the techniques used in electronic synthetic aperture radar processing (in counter-distinction to optical processing methods) can be modified for moving target location and tracking.

The present invention utilizes such techniques to provide an AMTI radar system that overcomes the above-recited and other deficiencies prevalent in state of the art airborne search radar systems.

SUMMARY OF THE INVENTION

The AMTI radar system comprehended by the present invention utilizes three radar antennas placed on the aircraft in a line coincident with its flight velocity vector. Radar echo signals received by these antennas are filtered into narrow band channels. Signals in the clutter frequency spectrum are delayed to achieve phase coincidence and then cancelled by phase inverting the output of the center antenna and summing its output with the delayed outputs of the remaining antennas. Signals from moving targets emerge from the system uncancelled and are compared by a phase comparator. With respect to these uncancelled signals the system operates as an interferometer and provides target bearing information. Range and other radar information are processed in the conventional manner. The invention also comprehends the use of moving range gates and integrators at the outputs of the clutter cancellers (summing networks) to improve system gain. Changes in aircraft ground speed are accommodated for by switching the various channel outputs to appropriate delay lines and variable gain is provided for each antenna.

It is a principal object of the invention to provide an AMTI radar having improved clutter cancelling capabilities.

It is another object of the invention to provide an AMTI radar system of the type described having higher signal gain than currently available systems.

It is another object of the invention to provide an AMTI radar system of the type described having aircraft motion compensation switching.

These, together with other objects, advantages and features of the invention, will become more apparent from the following detailed description taken in conjunction with the illustrated embodiments in the accompanying drawings.

DESCRIPTION OF THE DRAWINGS

FIG. 4 illustrates the dispersive delay filter characteristics of Antenna A of FIG. 2; and, FIG. 5 illustrates the dispersive delay filter characteristics of Antenna C of FIG. 2.

DETAILED DESCRIPTION OF THE PREFERRED EMBODIMENT

A synthetic aperture radar can be viewed as a linearly moving antenna pulsed periodically by a coherent transmitter. The signals returned from an approximately plane-scattering surface like the earth's surface viewed from one side of the aircraft have different but unique doppler frequencies varying approximately as the cosine of the look-angle from the aircraft flight axis. Doppler filters will therefore separate signals from different angles of arrival while range to targets can be accurately determined by time of arrival. To increase the "gain" of the system, many target returns can be integrated by a processor which is informed of the motion of the antenna and has a fixed logic built in relating the observables — range, range rate and flight path — to a spatial image of the earth's plane.

Figure 1:
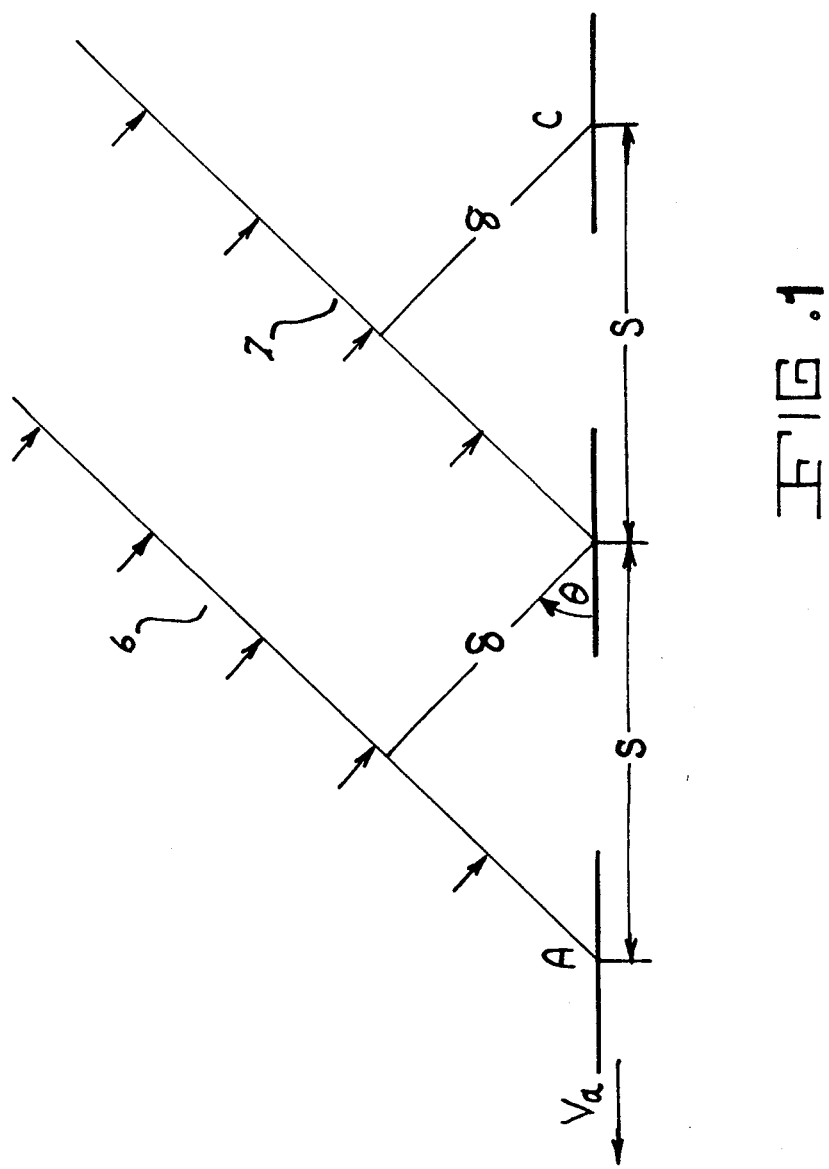
FIG. 1 illustrates schematically the incident plane waves due to a target at heading $\theta$ relative to the aircraft axis.

The basic idea of the clutter canceller of the present invention is that signals 6 and 7 from stationary targets on the ground arriving at two antenna elements A and B from a direction $\theta$ as illustrated in FIG. 1 have a unique and nearly linearly related phase delay, $\delta$, versus doppler frequency $f_d$, when these antennas are displaced laterally along the flight path of the radar platform. Ground clutter cancellation can be achieved by a filter which separates the doppler spectrum into narrow channels and applies a given phase shift or delay to echoes in the narrow passband of this filter. To achieve cancellation two antennas displaced laterally along the flight axis are required each having a filter and delay elements. To attain clutter-free, simultaneous phase data to use for angle bearing measurements three antennas are required as shown in FIG. 2.

Figure 2:
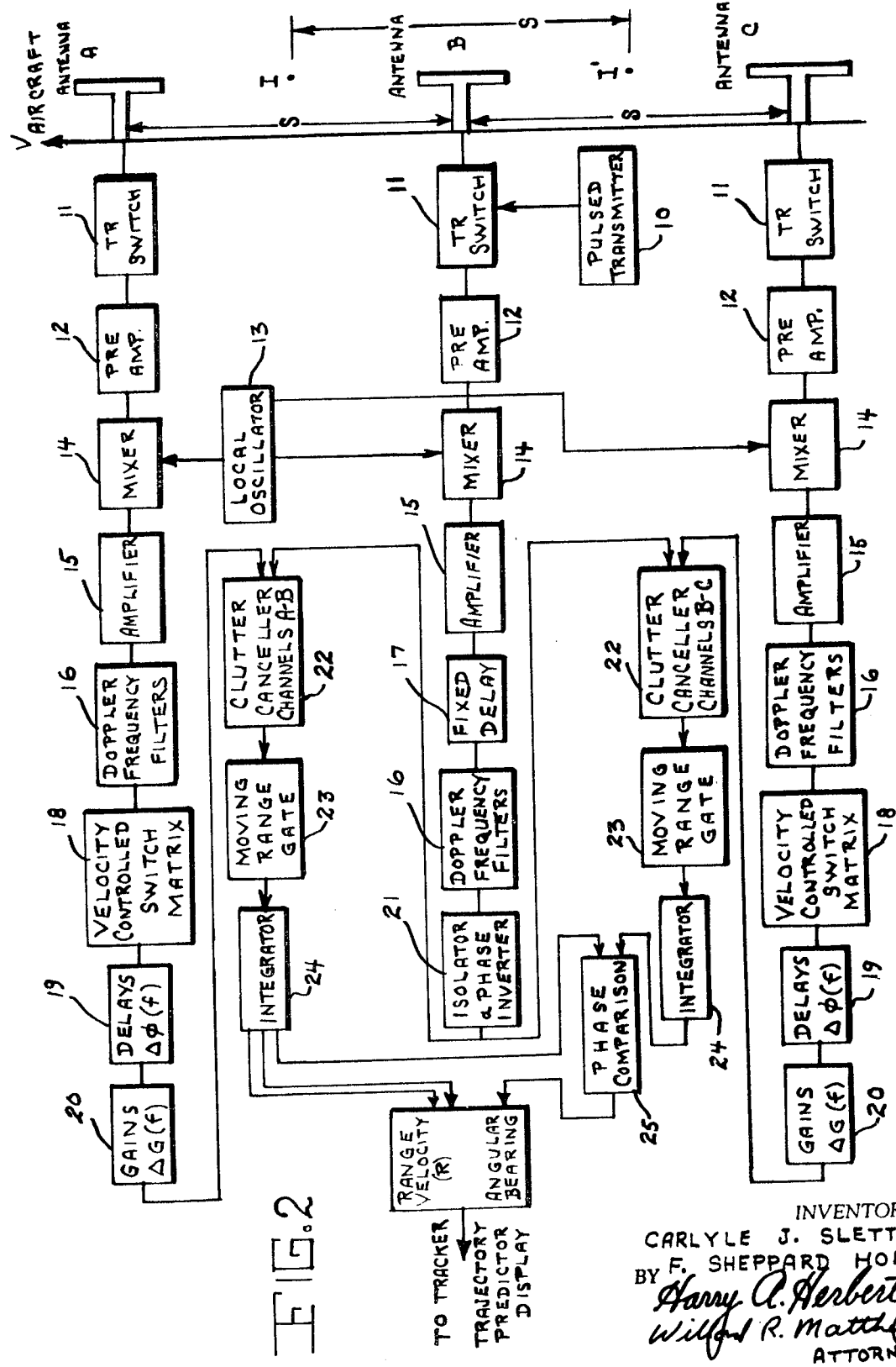
FIG. 2 is a block diagram of the dispersive delay doppler filter clutter cancelling and signal interrogator comprehended by the invention.

Referring now to FIG. 2, antennas A, B and C are positioned on the aircraft in a line coincident with its velocity vector V a distance s apart. TR switches 11 permit transmitting and receiving on all antennas although in practice transmitter 10 would normally only transmit through antenna B. The received doppler echo signals are amplified by preamplifiers 12 and mixed with the output of local oscillator 13 in mixers 14. After further amplification by amplifier 15 the signals are filtered into narrow band channels by doppler filters 16. Antenna B is provided with a fixed delay 17 to permit phase coincidence of the signals on all antennas (both leading and lagging). Doppler frequency signals in the clutter frequency aperture are delayed on antennas A and C by means of delay lines 19. Velocity controlled switch matrixes 18 connect the narrow band channels to appropriate delays in response to aircraft ground speed. The doppler echo signals in the clutter frequency spectrum from all antennas are thus made phase coincident. The signals from antenna B are phase inverted by phase inverter 21. This phase inverter signal is then summed with the outputs of antennas A and C in clutter cancellers 22. Signals from moving targets are not cancelled and are fed to moving range gate 23. The outputs of range gates 23 are integrated by integrator 24 to improve system gain. The outputs of integrator 24 are compared by phase comparator 25 to ascertain target bearing information. Antenna gains can be adjusted by gain device 20.

Figure 3:
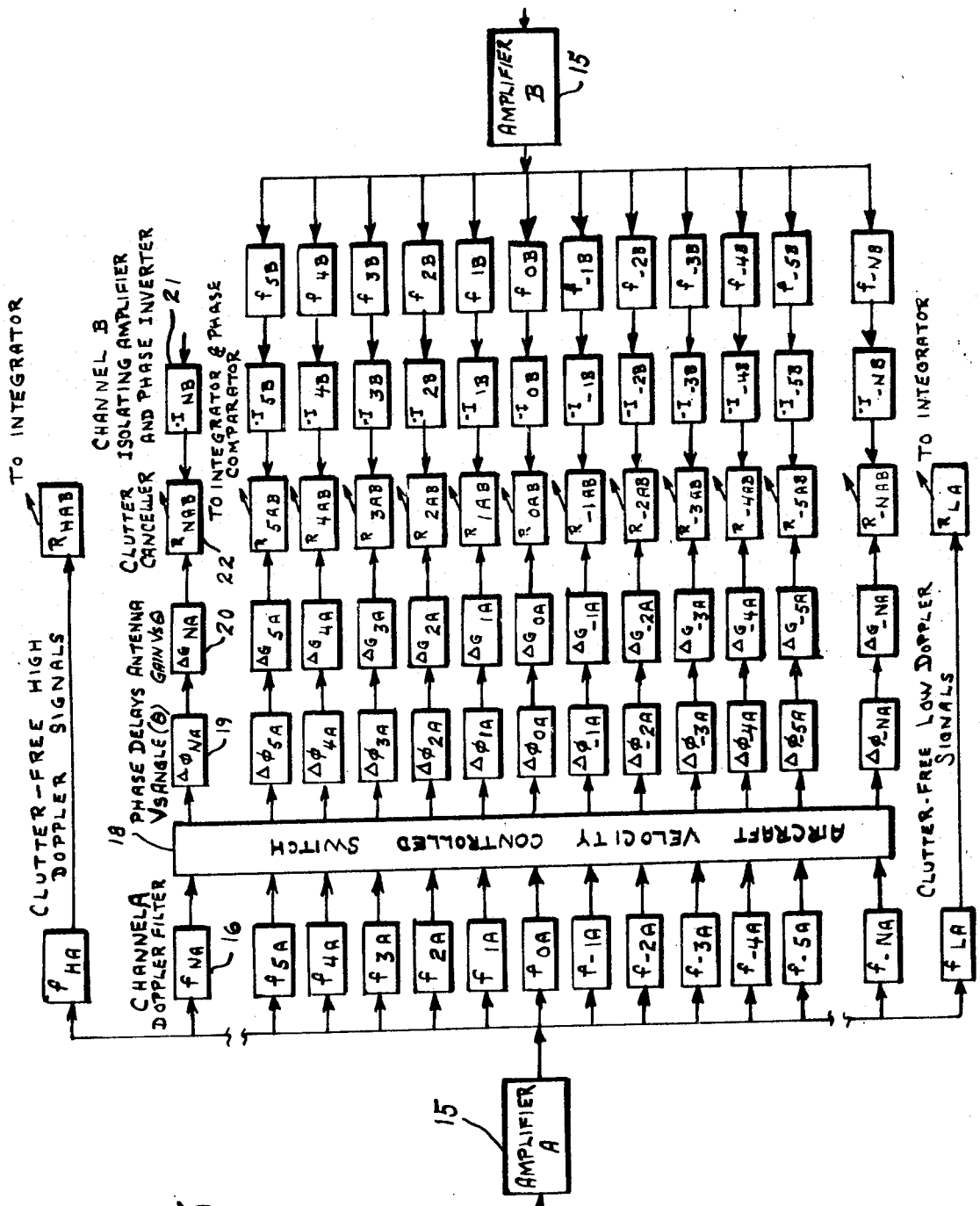
FIG. 3 is a block diagram showing details of the clutter canceller of FIG. 2.

To explain how fixed ground echoes are rejected, the four functional components following the amplifiers are shown in more detail in FIG. 3 for the A and B channels of FIG. 2.

The incoming signals from each antenna A, B and C are amplified and the doppler spectrum separated into as many channels as possible with a digital filter or analog comb filter. The aircraft velocity, $V_a$, should be large enough to provide a clutter spectrum at 100 MHz of 50 channels or more with available narrow pass band filters. If the aircraft changes ground velocity sufficiently, the switching matrix 18 switches the output of the band pass filter 16 to the adjacent channel. This avoids the need to make either the filter or delay components variable with speed of the aircraft. The column marked $\Delta\phi nA$ are the phase delays needed to bring the pulses received on antenna A into phase with those received on antenna B for the different angles of arrival and hence correspondingly different doppler frequencies as illustrated by FIGS. 4 and 5. The column $\Delta G_{nA}(\theta)$ corrects for the known gain (measured previously on an antenna pattern range) differences between antenna A and antenna B with these antennas mounted on the aircraft. Both $\Delta \phi_{nA}$ and $\Delta G_{nA}$ could be varied for range and hence depression angles if this refinement is desired.

On channel B a filter bank identical to that used in channel A is required but a fixed delay of only about $(\lambda_o/4) = S$ is needed for all doppler channels. Some isolation and 180° ($\pi$) inversion can be inserted in the doppler B channels so the vector addition for each doppler frequency canceller will yield a residue signal only when a doppler signal arrives from a direction not corresponding to the angle at which fixed ground targets produce this doppler frequency. It is necessary to have doppler pass bands at doppler frequencies ($f \pm H$) outside of the ground clutter spectrum in order to track high speed targets. These channels can bypass the delay and gain compensation elements because these signals are clutter free. Enough doppler filter channels at these large doppler frequencies must be provided to permit range tracking and integration of these signals which correspond to fast approaching or receding targets.

Channel C is identical with channel A except that the phase delays $\Delta\phi_n$ are connected to the opposite numbered filters, that is, $f_5$ feeds into $\Delta \phi_{-5}$. The residue signals from clutter cancellers AB and BC are phase compared to give bearing angles. If this signal is due to reflection from a fixed target on the ground at azimuth angle $\theta_g$ then the received signal will have a doppler frequency $$f_g = f_o [ 1 + (2 V_a/c) \cos \theta_g ]$$

Thus for fixed targets and a given $V_a$ there is a unique correspondence between $\theta_g$ and $f_g$.

The receiving path length delay for antenna B relative to antenna A (See FIG. 1) for doppler frequency channel $f_g$ (that is, for ground clutter echoes from direction $\theta_g$) will be $$\sigma_g = S \cos \theta_g = S [(f_g - f_o)/f_o ] (c/2V_a).$$

The same receiving path length delay will occur for antenna C relative to antenna B. If the path delay $\sigma_{A_g} = S + \sigma_g$ (see FIG. 4) is inserted in antenna channel A then the fixed path delay S inserted in antenna channel B will bring the clutter signal (fixed ground echoes) in the two antenna channels into phase (path length) coincidence. Thus a 180° phase inversion in the antenna channel B followed by addition of the two antenna channels will just cancel the clutter signal for the doppler frequency channel $f_g$. Similarly if the path delay $\sigma_{C_g} = \sigma_g$ (see FIG. 5) is inserted in antenna channel C and channel B is processed as described above then addition of these antenna channels will again cancel the clutter signal for the doppler frequency channel $f_g$.

Now consider a moving target whose doppler frequency $f_t$ equals $f_g$. If the target has nonzero radial velocity then its bearing angle $\theta_t$ cannot equal the fixed target bearing angle $\theta_g$ associated with the doppler frequency channel $f_g$. The clutter canceller associated with doppler frequency channel $f_g$ will cancel only signals of frequency $f_g$ arriving from direction $\theta_g$ and hence it is assured that the signal from the moving target having frequency $f_g$ and direction of arrival $\theta_t \neq \theta_g$ will not be cancelled but will appear as a residual signal at the canceller output. This will occur at the outputs of both cancellers AB and BC and phase comparisons of these signals will determine bearing angle. With respect to direction finding this system is equivalent to an interferometer of base line length S consisting of point source receivers located at I and I'. (See FIG. 2).

Synthetic aperture gain is achieved by integrating many hits from a target because the range doppler changes can be logically related for flat terrain with nonscintillating targets. The same strategy can be used to integrate signals emerging from doppler filters. These filters can be followed by a series of moving range bins 23 (timed of course from the master pulse circuits driving the coherent pulsed transmitter) phased to receive targets moving in range with respect to the radar platform with the doppler rate of the filter. This means if a moving target at the ranges monitored stays in a doppler filter for a few seconds, integration of many hits can be obtained on it in its moving range bin. Hence given the kinematics and dynamics of the radar platform and moving target it would be difficult indeed for a target to escape presenting a doppler signal for many pulse hits. To implement this integration subsystem we take the residue signal $$\sum_{n=-1}^{N} R_n$$

and the doppler signals outside of the clutter spectrum $R_H$ and $R_L$ and store them in a moving range gate following each canceller. The dopplers are tagged by the channels and of course the range is known for each moving range bin. When a signal emerges from the noise after many hits, it can then be phase compared between channels AB and BC for average bearing angle. Once signals are detected with this high gain system they should be turned over to the adaptive phase sensing gate 25 which looks in adjacent doppler channels and tracks the phase on targets to measure $\dot{r}$ and $\ddot{r}$ (range rate and range acceleration).

While the invention has been described in one presently preferred embodiment, it is understood that the words which have been used are words of description rather than words of limitation and that changes within the purview of the appended claims may be made without departing from the scope and spirit of the invention in its broader aspects.

What is claimed is:

1. The method of cancelling clutter in an AMTI radar system comprising the steps of
   simultaneously receiving radar doppler echo signals on multiple radar antennas serially disposed in spaced relationship along the flight velocity vector of an AMTI radar bearing aircraft,
   separating the received doppler echo signals from each antenna into a multiplicity of narrow band clutter frequency spectrum signals and narrow band extra-clutter frequency spectrum signals,
   delaying the narrow band clutter frequency spectrum signals in each antenna channel to effect phase coincidence therebetween,
   effecting a 180° out of phase relationship between the clutter frequency spectrum signals of adjacent antennas, and
   summing the delayed, out of phase, clutter frequency spectrum signals of adjacent antennas.

2. An AMTI radar clutter cancelling system comprising
   first, second and third radar antennas serially disposed in spaced relationship along the flight velocity vector of an AMTI bearing aircraft,
   a filter means connected to each antenna for providing multiple narrow band doppler signal channels in the clutter frequency spectrum and narrow band doppler signal channels in the extra-clutter frequency spectrum,
   delay means connected to each clutter frequency spectrum channel adapted to effect phase coincidence between the doppler signals from each antenna,
   a phase-inverter connected to said second antenna,
   means for summing the delayed output of said first antenna and the phase-inverted, delayed output of said second antenna, and
   means for summing the delayed output of said third antenna and the phase-inverted, delayed output of said second antenna.

3. An AMTI radar clutter cancelling system as defined in claim 2 including switching means adapted to switch the outputs of said clutter frequency spectrum channels to appropriate selected delay means in response to changes in aircraft ground speed.

4. An AMTI radar clutter cancelling system as defined in claim 3 including gain adjusting means connected to said first and said third antennas.

5. An AMTI radar system comprising
   first, second and third radar antennas serially disposed in spaced relationship along the flight velocity vector of the AMTI radar bearing aircraft,
   a filter means connected to each antenna for providing multiple narrow band doppler signal channels in the clutter frequency spectrum and narrow band doppler signal channels in the extra-clutter frequency spectrum,
   delay means connected to each clutter frequency spectrum channel adapted to effect phase coincidence between the doppler signals from each antenna,
   a phase inverter connected to said second antenna,
   first summing means for summing the delayed output of said first antenna and the phase-inverted delayed output of said second antenna, second summing means for summing the delayed output of said third antenna and the phase-inverted delayed output of said second antenna, and
   phase comparison means adapted to compare the outputs of said first and second summing means and the outputs of the extra-clutter frequency spectrum narrow band doppler signal channels.

6. An AMTI radar system as defined in claim 5 including switching means adapted to switch the outputs of said clutter frequency spectrum channels to appropriate selected delay means in response to changes in aircraft ground speed.

7. An AMTI radar system as defined in claim 6 including gain adjusting means connected to said first and third antennas.

8. An AMTI radar system as defined in claim 7 including a moving range gate and integrating means connected between the outputs of each said first and second summing means and said phase comparison means.

* * * * *